May 26, 1925.
R. HESS
AUTOMOBILE LOCK
Filed March 14, 1924
1,538,936
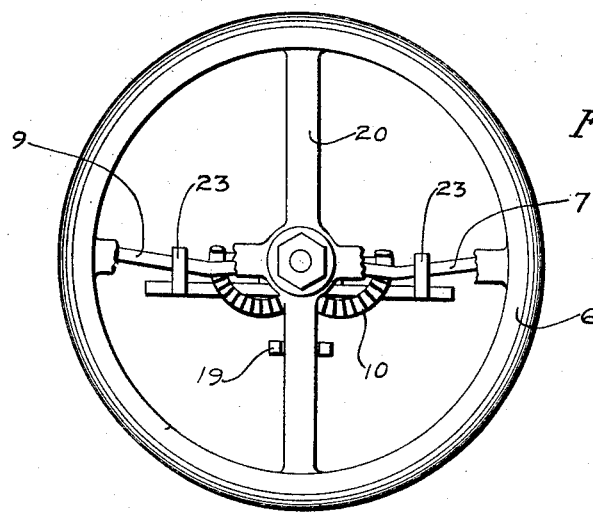
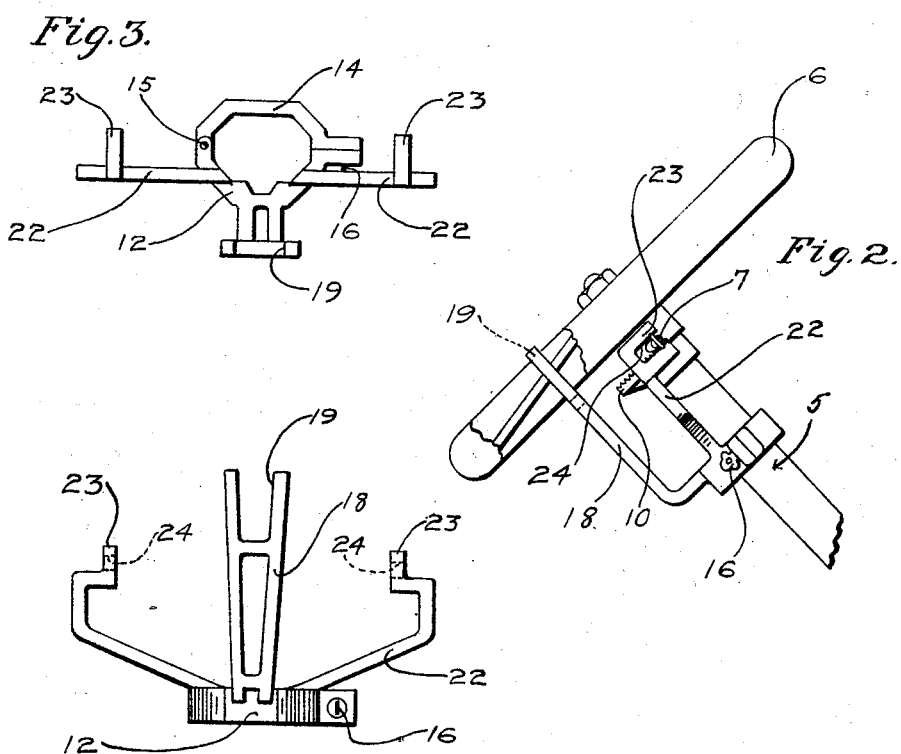
INVENTOR.
Ray Hess.
BY
ATTORNEYS.

Patented May 26, 1925.

1,538,936

UNITED STATES PATENT OFFICE.

RAY HESS, OF CHICAGO, ILLINOIS.

AUTOMOBILE LOCK.

Application filed March 14, 1924. Serial No. 699,271.

*To all whom it may concern:*

Be it known that I, RAY HESS, a citizen of the United States, residing at Chicago, in the county of Cook and State of Illinois, have invented certain new and useful Improvements in Automobile Locks, of which the following is a specification.

This invention relates to locks especially adapted for use on automobiles.

An important object of this invention is to provide a lock having simple means whereby the same may be quickly applied to a motor vehicle steering column without altering the construction of the steering column or associated parts and without inconvenience.

A further object of the invention is to provide a motor vehicle lock which when applied will positively prevent the manipulation of the gas and spark control arms and turning of the steering wheel.

A further object of the invention is to provide a lock of the character specified which is of highly simplified construction, durable in use, and cheap to manufacture.

Other objects and advantages will be apparent during the course of the following description.

In the accompanying drawing forming a part of this application and in which like numerals are employed to designate like parts throughout the same, Figure 1 is a plan view of a steering wheel and the adjacent control arms held in a set position by means of the improved lock;

Fig. 2 is a side elevation of the lock applied;

Fig. 3 is a plan view of the lock detached, and

Fig. 4 is a front elevation of the lock detached.

In the drawing, wherein for the purpose of illustration is shown a preferred embodiment of the invention, the numeral 5 designates a steering column, the upper portion of which has connection with a steering wheel 6 in the usual and well known manner.

Figs. 1 and 2 illustrate that the gas and spark control arms 7 and 9 are arranged directly beneath the steering wheel and are associated with and play over two segments 10 by means of which the arms are held in a set position.

As illustrated in Figs. 3 and 4 the lock is provided with a clamp consisting of a pair of more or less similarly formed sections 12 and 14 pivotally connected as indicated at 15. One end of the section 12 is provided with a lock 16 by means of which the sections 12 and 14 may be secured about the steering column.

The section 12 is provided with an upwardly extending arm 18 having diverging sides defining a socket or recess 19 for the reception of one of the spokes 20 of the steering wheel 6. When one of the spokes of the wheel is received in the recess 19, the wheel is, of course, positively held against turning and consequently the unauthorized operation of the vehicle is prevented.

The section 12 is also provided with upwardly inclined arms 22 having upwardly directed locking members or branches 23 provided with sockets or recesses 24 for the reception of the control arms 7 and 9.

It will be seen that when the arms 7 and 9 are extended into the recessed portions of the branches 23 the arms 7 and 9 will positively be held against operation. One of the most important features of the invention resides in the fact that the engagement of the arms 22 with the arms 7 and 9 hold the lock in an elevated and operative position. More specifically, an attempt to turn either of the levers 7 and 9 will only force the levers further into the recesses 24 and consequently the lock cannot be detached from engagement with the spoke 20 until the sections 12 and 14 are released from locking engagement with the steering column.

With reference to the foregoing description taken in connection with the accompanying drawing it will be seen that the improved lock may be conveniently applied to the steering column and will positively hold the steering wheel and the levers 7 and 9 against unauthorized operation. The lock may be conveniently applied by the operator without leaving his seat. The lock may be carried in any convenient place on the motor vehicle or it may be allowed to remain on the lower portion of the steering column when not in use.

Having thus described the invention, what is claimed is:

1. An automobile lock comprising a clamp consisting of a pair of pivotally connected sections, a lock for securing the sections about the steering column of an automobile, one of the sections being provided with an upwardly extending member having a recess to receive one of the spokes of a steering wheel, and arms having branches provided with recesses to receive the control levers adjacent the steering wheel.

2. A steering wheel lock comprising a clamp consisting of a pair of sections adapted to encircle the steering column, means to secure the sections in position on the steering column, an arm projecting upwardly from one of the sections and consisting of a pair of diverging sides defining a recess to receive one of the spokes of the steering wheel whereby to hold the steering wheel against turning, and a pair of arms projecting from opposite ends of one of said sections and having means to engage the control levers adjacent the steering wheel.

3. A motor vehicle lock comprising a clamp consisting of a pair of sections pivotally connected at one of their ends and having a lock at their other ends whereby the sections may be secured about a steering column, and a pair of arms projecting upwardly from one of said sections and provided with branches formed with recesses to receive the control levers adjacent the steering wheel and constituting a means to hold the lock in an elevated and operative position.

In testimony whereof I affix my signature.

RAY HESS.